(12) United States Patent
Ben-Josef et al.

(10) Patent No.: US 8,220,171 B2
(45) Date of Patent: Jul. 17, 2012

(54) SPIRIT LEVEL HAVING HORIZONTAL BUBBLE VIAL WITH IMPROVED BUBBLE VISIBILITY

(75) Inventors: Rafi Ben-Josef, Kadarim (IL); Shahar Harari, Tel Aviv (IL); Yossi Palatshe, Tiberias (IL); Tsvi Hershkovich, Nahariya (IL)

(73) Assignee: Kapro Industries Ltd., Bikat Beit Hakerem (IL)

( * ) Notice: Subject to any disclaimer, the term of this patent is extended or adjusted under 35 U.S.C. 154(b) by 0 days.

(21) Appl. No.: 13/061,915

(22) PCT Filed: Dec. 13, 2009

(86) PCT No.: PCT/IL2009/001184
§ 371 (c)(1),
(2), (4) Date: Mar. 2, 2011

(87) PCT Pub. No.: WO2010/067371
PCT Pub. Date: Jun. 17, 2010

(65) Prior Publication Data
US 2011/0162222 A1    Jul. 7, 2011

(30) Foreign Application Priority Data
Dec. 11, 2008 (IL) .......................... 195885

(51) Int. Cl.
*G01C 9/32* (2006.01)
(52) U.S. Cl. .......................... 33/348; 33/379
(58) Field of Classification Search .............. 33/348, 33/348.2, 379
See application file for complete search history.

(56) References Cited

U.S. PATENT DOCUMENTS

| | | | |
|---|---|---|---|
| 320,360 | A | 6/1885 | Hutchins |
| 692,097 | A | 1/1902 | Wood |
| 771,803 | A | 10/1904 | Bishop |
| 2,362,872 | A | 11/1944 | Weagle |
| 3,694,090 | A | 9/1972 | Ohyama |
| 4,332,046 | A | 6/1982 | Foley et al. |
| 4,653,193 | A | 3/1987 | Kennedy et al. |
| D320,360 | S | 10/1991 | Kennedy |
| 5,414,937 | A | 5/1995 | Denley |
| 5,755,037 | A | 5/1998 | Stevens |
| 6,681,494 | B1 * | 1/2004 | Bowden .......................... 33/379 |
| 6,957,494 | B1 | 10/2005 | Foran |
| 7,263,778 | B2 * | 9/2007 | Lang et al. ...................... 33/379 |

(Continued)

FOREIGN PATENT DOCUMENTS
CH    189 440    2/1937
(Continued)

OTHER PUBLICATIONS

International Search Report mailed Mar. 29, 2010 in International Application PCT/IL2009/001184, filed Dec. 13, 2009.

(Continued)

*Primary Examiner* — G. Bradley Bennett
(74) *Attorney, Agent, or Firm* — Abraham Herskovitz; Harold L. Novick; Hershkovitz & Assoc., LLC

(57) ABSTRACT

Spirit levels including a horizontal bubble vial with improved bubble visibility for assisting user readability for leveling purposes. The improved bubble visibility is achieved by coloring a bubble's uppermost surface as perceived by a user.

20 Claims, 15 Drawing Sheets

U.S. PATENT DOCUMENTS

| | | | |
|---|---|---|---|
| D560,521 S | 1/2008 | Katz | |
| D573,908 S | 7/2008 | Levinson | |
| 7,779,545 B2 | 8/2010 | Kallabis | |
| 2005/0229413 A1* | 10/2005 | Foran | 33/379 |
| 2006/0037204 A1 | 2/2006 | Gruetzmacher | |
| 2007/0246116 A1 | 10/2007 | Peak et al. | |
| 2009/0139102 A1 | 6/2009 | Kallabis | |
| 2011/0271537 A1* | 11/2011 | Scheyer et al. | 33/379 |

FOREIGN PATENT DOCUMENTS

| | | |
|---|---|---|
| CN | 2 938 031 | 8/2007 |
| DE | 31 25 510 | 1/1983 |
| DE | 82 36 725.6 | 5/1983 |
| GB | 836 728 | 6/1960 |
| GB | 936 517 | 9/1963 |
| GB | 2 222 677 | 3/1990 |
| WO | WO 2004/044524 | 5/2004 |
| WO | WO 2006/023701 | 3/2006 |
| WO | WO 2007/072489 | 6/2007 |
| WO | WO 2008/107868 | 9/2008 |

OTHER PUBLICATIONS

International Search Report mailed Oct. 14, 2010, in International Application No. PCT/IL2010/000457, filed Jun. 9, 2010.
European Search Report corresponding to EP 09 83 1568 dated Jan. 30, 2012.

* cited by examiner

SPIRIT LEVEL HAVING HORIZONTAL BUBBLE VIAL WITH IMPROVED BUBBLE VISIBILITY

CROSS-REFERENCE TO RELATED APPLICATION

This application is the National Phase of International Application Serial No. PCT/IL2009/001184 filed 13 December 009 and designating the United States, which application claims priority on Israel patent application No. IL 195885 filed Dec. 11, 2008, which is incorporated herein by reference. This application also claims the benefit of International Application Serial No. PCT/IL2010/000457 filed Jun. 9, 2010, which designated the United States and which is incorporated herein by reference.

FIELD OF THE INVENTION

This invention relates to spirit levels.

BACKGROUND OF THE INVENTION

Leveling instruments employing one or more bubble vials for indicating level in horizontal and vertical planes include a wide range of measuring and layout tools, for example, spirit levels, tapes, laser tools, squares, and the like, and other equipment such as tripods, equipment platforms, and the like. Bubble vials are now mostly made from transparent acrylic material and typically have a symmetrical barrel shaped cavity mostly filled with a typically UV resistant non-freezing vial liquid leaving a small lengthwise directed ellipsoidal bubble floating at the top of its cavity on placing a spirit level on a horizontal surface. The vial liquid has a concave meniscus due to the surface tension of the non-freezing vial liquid. The bubble is an air bubble, a noble gas bubble, or the like. Either a bubble cavity's internal surface or a bubble vial's outside surface is provided with a pair of spaced apart reference markings by means of which a user interprets whether a surface is level or plumb by sighting one or both of its bubble's curved meniscus ends relative to its reference markings. Horizontal bubble vials are typically designed such that their bubbles fit snugly between their spaced apart reference markings on placing same on a horizontal surface. However, craftsmen often have difficulty in accurately determining the precise location of a bubble.

Considerable prior art attempts have been made over the years to assist in the readability of bubble vials for determining accurate bubble location.

U.S. Pat. No. 692,097 to Wood illustrates and describes filling a spirit level with a fluorescent liquid and providing a background for enabling color contrasting of an air bubble to its surrounding vial liquid. The background may be supplied by painting or otherwise coloring the tube itself or by a mirror or by applying a strip of paper bearing the desired color stripe. FIG. 3 is a top plan view showing a strip of paper with a colored stripe suitable for use as background in FIG. 1's top plan view.

U.S. Pat. No. 771,803 to Bishop illustrates and describes a spirit level filled with a practically opaque vial liquid to leave an air bubble and an elongated background member in the form of a rod, stem or spindle, which is of a different color to the vial liquid and is clearly visible through the air bubble.

U.S. Pat. No. 2,362,872 to Weagle illustrates and describes a spirit device filled with a transparent vial liquid to leave an air bubble and having a luminous material on an opposite side from a user. Light passing through the bubble vial and the vial liquid excites the luminous material. The luminous material can be either embedded in a bubble vial container or on the surface thereof. The spirit device may also be provided with opaque guide lines on the luminous material for assisting in accentuating the air bubble's outline.

U.S. Pat. No. 5,414,937 to Denley illustrates and describes a headlamp indicating device with a highlighted bubble vial. The indicating device includes a bubble vial filled with a transparent vial liquid to leave an air bubble. The indicating device includes an underlying scale to indicate the degree of tilt of the bubble vial from horizontal. The indicating device optionally includes a strip of black material adapted to be secured around the bubble vial and a black tinted plastic cap such that the resulting image when viewing the bubble vial from above is a black lined oval positioned over the black lined scale (see Col. 4, lines 19 to 22).

U.S. Pat. No. 6,957,494 to Foran illustrates and describes a bubble vial filled with a transparent vial liquid to leave an air bubble and having a pair of dark colored bands which enhance a bubble's visibility by their reflection on the phase interface between the vial liquid and the air bubble to predominantly dark color a bubble's opposite curved meniscus ends. The bands may be opaque or translucent or tinted such that some light passes through them. The bands may be positioned on the exterior surface of the vial body, an interior surface or between the interior and exterior surfaces. Alternatively, the bands can be integral with vial body and, in such cases, be may be comprised of opaque or translucent portions. The vial may further include end closures which are dark colored and provide further reflection to the phase interface in addition to that of the bands (see Col. 3, lines 1 to 7).

US Patent Application Publication No. 2006/0037204 to Gruetzmacher illustrates and describes a two phase bubble vial including a colored gas bubble. The colors of the vial liquid and the reference markings on the bubble vial's exterior surface can be selected to further enhance the contrast between the gas bubble and the vial liquid and/or the reference markings.

US Patent Application Publication No. 2007/0246116 to Peak et al. illustrates and describes a drainage pipe slope measuring device including a bubble vial for providing a user with a visual indication of the slope of a drainage pipe. FIG. 2 shows a window overlying the bubble vial and having separately colored green and red regions to provide a user with further visual contrast in a top plan view of the bubble vial. The green and red regions can alternatively be formed on the bubble vial's upperside surface as described in para. [0029] $2^{nd}$ sentence.

US Patent Application Publication No. 2009/0139102 to Kallabis illustrates and describes a spirit level with a bubble vial mounted in a bubble vial housing with opposite colored end face regions for providing a high contrast between the end of an air bubble and its surrounding vial liquid.

PCT International Application No. PCT/IB2003/004391 entitled High Contrast Spirit Level Vial and published under PCT International Publication No. WO 2004/044524 illustrates and describes a two phase bubble vial including a liquid globule floating on a liquid medium. The colors of the liquid globule and the liquid medium are selected for enhanced color contrasting.

Commonly owned PCT International Application No. PCT/IL2006/001475 entitled Bubble Vial having Improved User Readability and published under PCT International Publication No. WO 2007/072489 illustrates and describes several constructions for achieving improved user readability. Such constructions include inter cilia an elongated leveling aid, color contrasting light sources and vial liquids.

SUMMARY OF THE INVENTION

The present invention is directed towards spirit levels including a horizontal bubble vial with improved bubble visibility for assisting users to accurately and readily determine its bubble location relative to its one or more reference markings for assisting user readability for leveling purposes. The present invention is based on the realization that most users use two sided spirit levels as one sided spirit levels insofar that they become accustomed to disposing their spirit levels with their major front surfaces facing them before sighting their horizontal bubble vial. From this position, the users sight the horizontal bubble vials along a line of sight bounded between a top plan view directed downwards onto the horizontal bubble vial and a front elevation view directed towards a spirit level's front major surface.

By virtue of this realization, the present invention proposes disposing a coloring agent on a bubble vial's far side relative to a user's position for coloring its bubble's uppermost surface as perceived by a user. The coloring agent is necessarily at least partially disposed in an upper half of a rear upper quadrant in a left end elevation view of a spirit level in close proximity to its central region for being sighted by a user along a line of sight in its opposing front upper quadrant in the same left end elevation view. It should be noted that the left end elevation view has been selected for convenience purposes for describing and claiming the present invention. The aforesaid perceived coloring is imparted by internal reflection and/or refraction to differing degrees depending on the size, location, and make up of a particular coloring agent, a vial's shape, and also a user's position and line of sight. It should be noted the coloring agents may obstruct certain lines of sight and may preclude other lines of sight by being perceived to form a contiguous colored region together with a colored bubble surface. However, it is believed that the coloring and ensuing improved bubble visibility along most lines of sight between a top plan view and a front elevation view in some embodiments and from a front elevation view through a top plan view to a rear elevation view in other embodiments outweigh any user inconvenience due to obstructed or precluded lines of sight.

Spirit levels embodying the present invention include horizontal bubble vials provisioned with transparent, translucent or opaque coloring agents. Coloring agents can be painted onto a bubble vial surface, printed onto a bubble vial surface, adhered to a bubble vial surface, embedded in a bubble vial acrylic material, inserted into a groove formed along a bubble vial surface, and the like. Coloring agents can be constituted by solid stripes, line formations, dot formations, and the like. Alternatively, coloring agents can be constituted by discrete coloring members juxtapositioned against or in close proximity with a bubble vial.

Spirit levels embodying the present invention include horizontal bubble vials provisioned with coloring agents of differing lengthwise directed length in a left end elevation view from a minimum length substantially co-extensive with a bubble cavity's central region occupied by its bubble on placing a spirit level on a horizontal surface and a maximum length extending along an entire bubble vial.

Spirit levels embodying the present invention include horizontal bubble vials provisioned with coloring agents of differing arcs from a left end elevation view. The arcs have an arc center at an intersection between a vertical bubble vial plane and a horizontal bubble vial plane respectively perpendicular and parallel to a spirit level's leveling surface and passing through its bubble vial from a left end elevation view. The coloring agents subtend a minimum arc of about 5° upto a full rear upper quadrant as defined between the aforesaid vertical and horizontal bubble vial planes from the left end elevation view.

The vial liquid can be either transparent or opaque and either colorless or colored. The coloring agents are preferably brightly colored reds, blues, and the like. The coloring agents can be a primary color or a combination of two or more colors. In the case of colored vial liquids, the coloring agents are color contrasted with same, for example, a red coloring agent and a greenish yellow vial liquid, and the like, for further accentuating bubble visibility.

Additional coloring agents can be provided for coloring a central meniscus surface and/or meniscus end surfaces as perceived by a user for further accentuating bubble visibility. Vial housings for mounting horizontal bubble vials can be employed as additional coloring agents. Moreover, horizontal bubble vials can be further provisioned with a typically white or similar light colored opaque background on a horizontal bubble vial's far side relative to a user's position and along his line of sight for further accentuating bubble visibility.

Spirit levels embodying the present invention can include conventional shaped horizontal bubble vials, for example, generally cylindrical bubble vials, rectangular parallelepiped bubble vials, banana shaped bubble vials, and the like. Alternatively, the spirit levels can include horizontal bubble vials with specifically designed external shapes. Accordingly, the bubble vial surfaces can be curved or flat from a left end elevation view of the spirit level.

Spirit levels embodying the present invention can be provisioned with a coloring agent such that users perceive the coloring effect on facing their front major surfaces only. Alternatively, spirit levels embodying the present invention can be provisioned with a first coloring agent such that users perceive the coloring effect on facing their front major surfaces and a second coloring agent such that users perceive the coloring effect on facing their rear major surfaces.

Spirit levels embodying the present invention can include a fully or nearly fully exposed horizontal bubble vial in a front elevation view. Alternatively, the spirit levels can include recessed horizontal bubble vials mounted in bubble vial pockets. The spirit levels can have a box shape, a so-called I-beam cross section, and the like.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF PREFERRED EMBODIMENTS OF THE INVENTION

Figure 1:
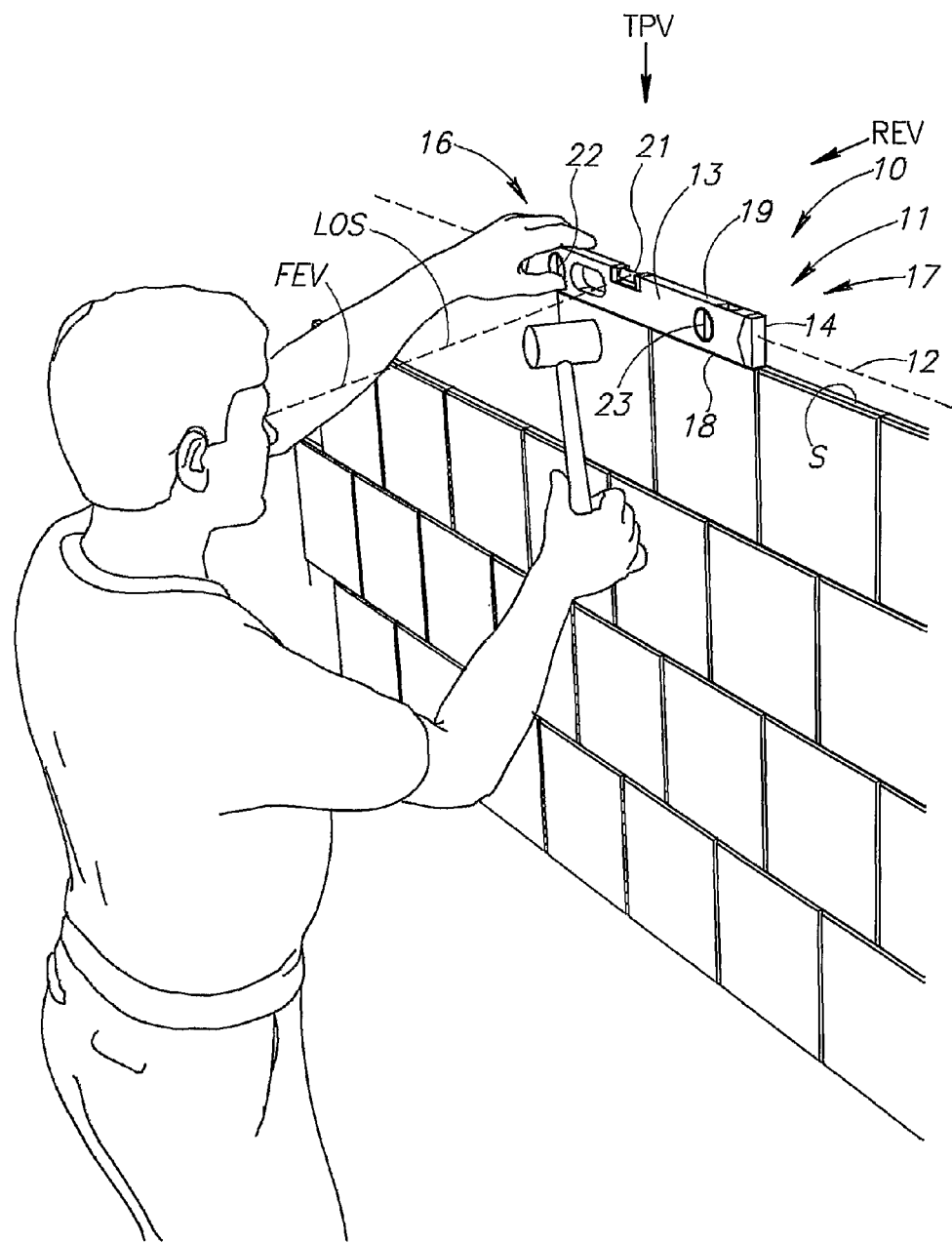
FIG. 1 is a pictorial view showing the use of a conventional spirit level with a horizontal bubble vial for indicating the inclination of a generally horizontal surface relative to the horizontal.
Figure 2:
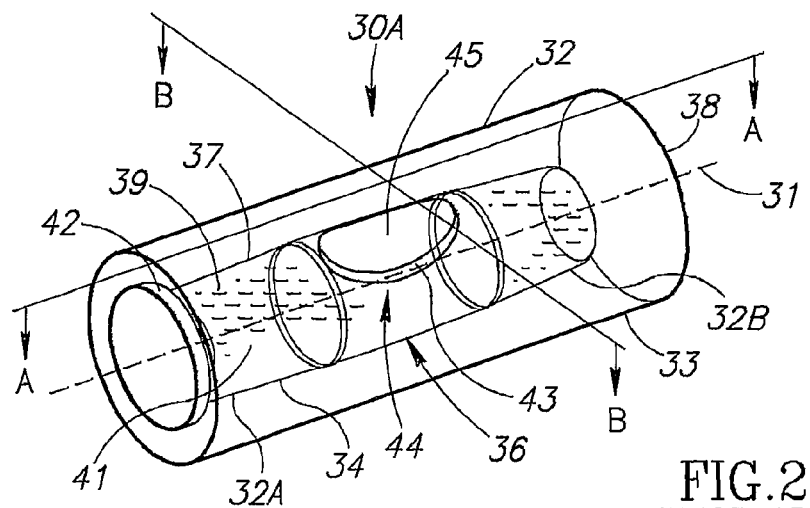
FIG. 2 is a front perspective view of a conventional cylindrical horizontal bubble vial.
Figure 3:
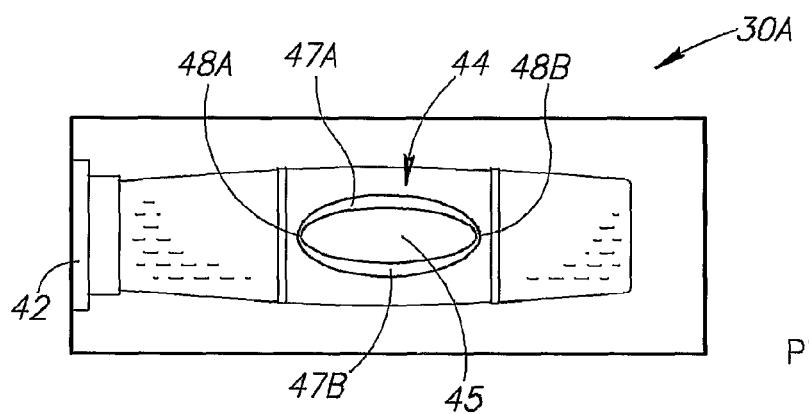
FIG. 3 is a top plan view of FIG. 2's bubble vial.
Figure 4:
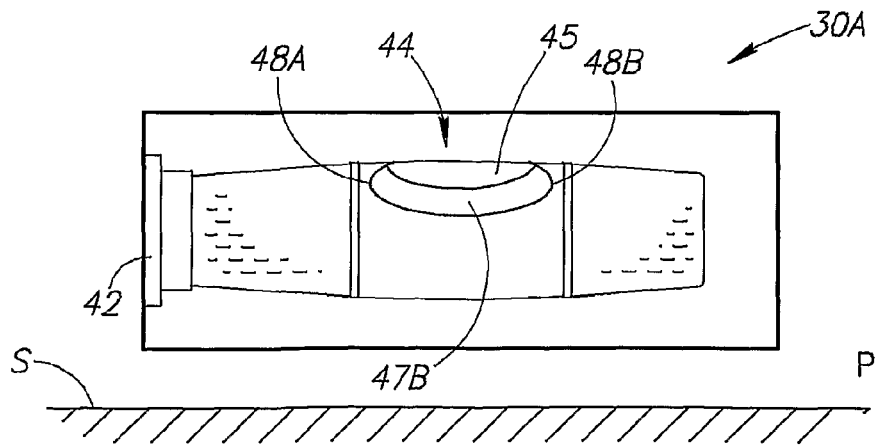
FIG. 4 is a front elevation view of FIG. 2's bubble vial.
Figure 5:
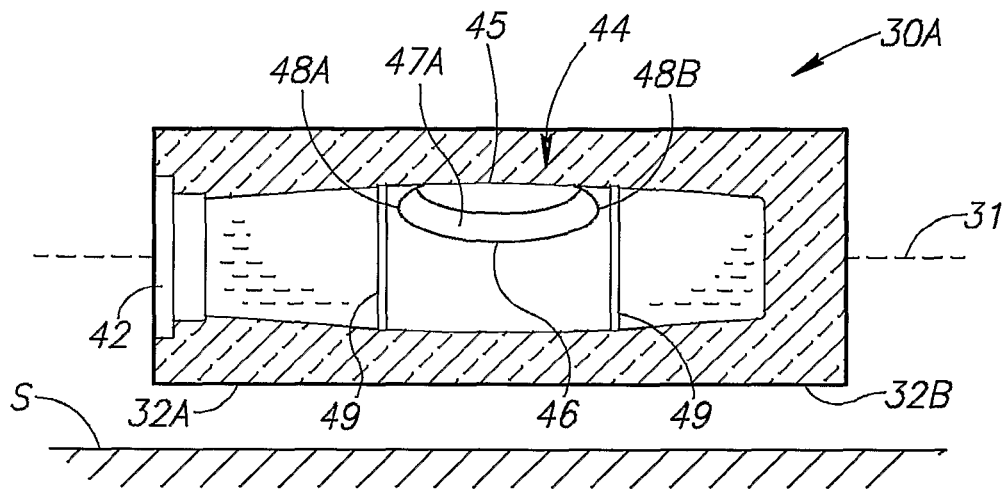
FIG. 5 is a longitudinal cross section of FIG. 2's bubble vial along line A-A therein.
Figure 6:
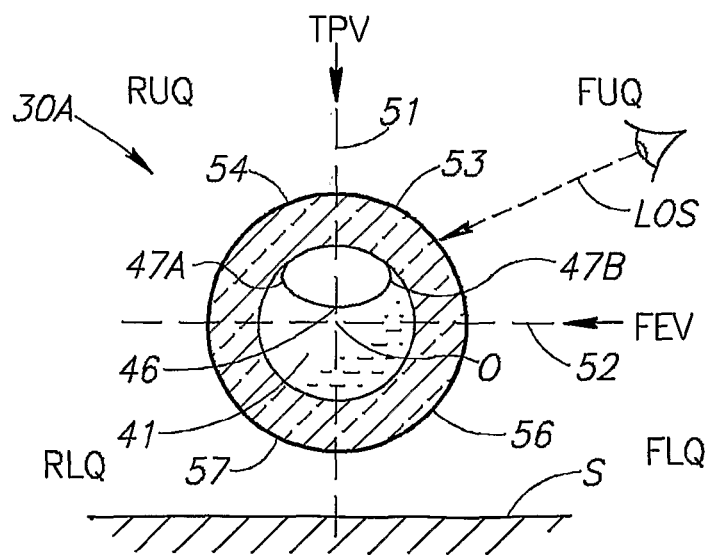
FIG. 6 is a transverse cross section of FIG. 2's bubble vial along line B-B therein from a left end elevation view.
Figure 7:
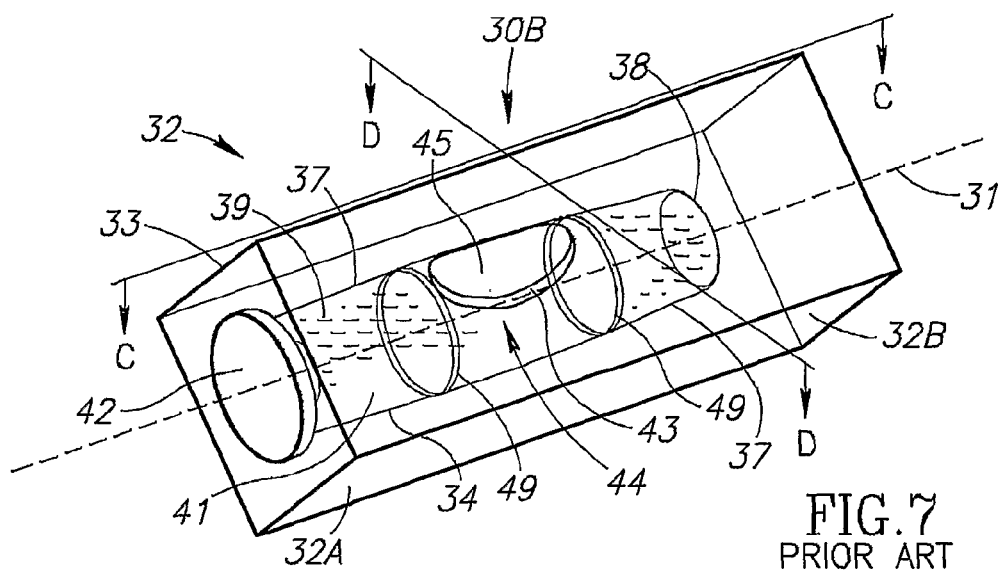
FIG. 7 is a front perspective view of a conventional rectangular parallelepiped horizontal bubble vial rotated at 45° to the conventional mounting of rectangular parallelepiped horizontal bubble vial.
Figure 8:
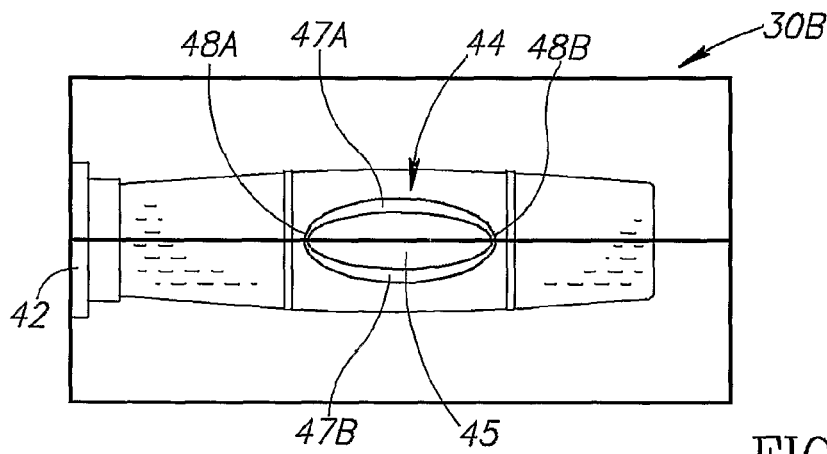
FIG. 8 is a top plan view of FIG. 7's bubble vial.
Figure 9:
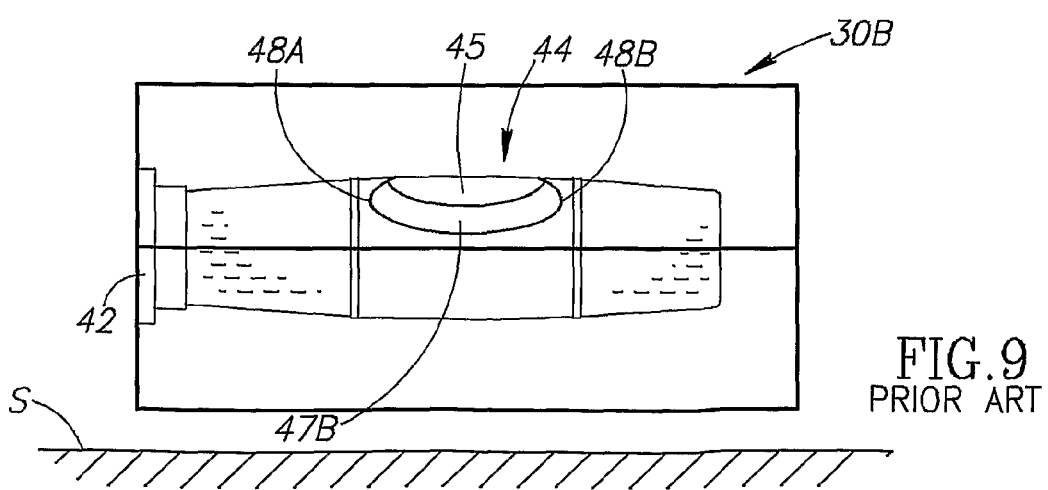
FIG. 9 is a front elevation view of FIG. 7's bubble vial.
Figure 10:
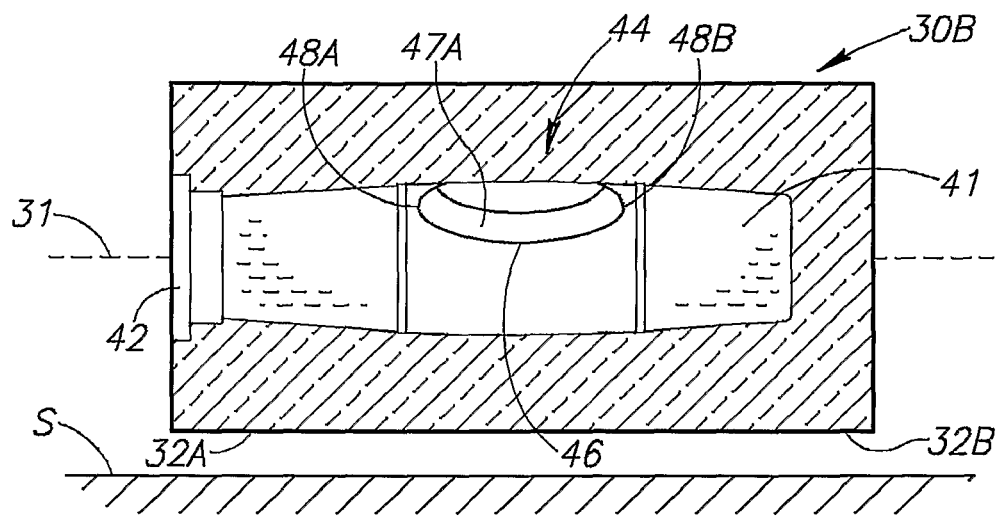
FIG. 10 is a longitudinal cross section of FIG. 7's bubble vial along line C-C therein.
Figure 11:
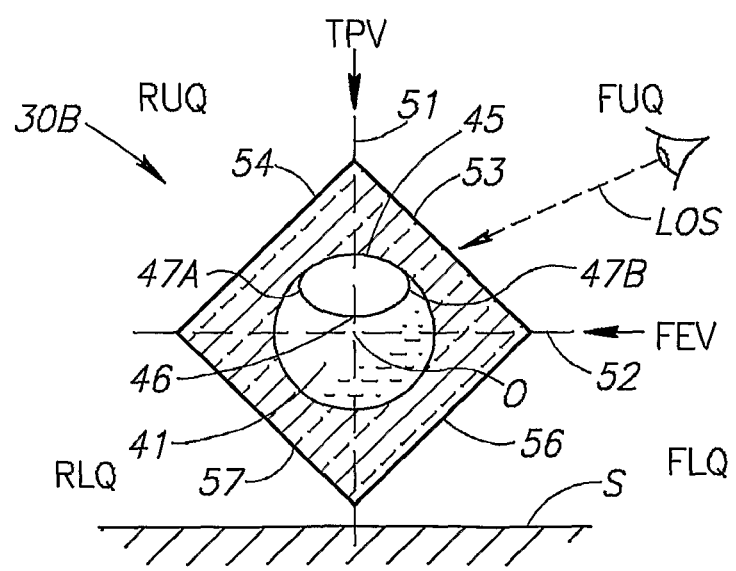
FIG. 11 is a transverse cross section of FIG. 7's bubble vial along line D-D therein from a left end elevation view.

FIG. 1 shows the use of a conventional spirit level 10 for leveling tiles on a wall. The spirit level 10 includes a main body 11 having a longitudinal axis 12, a front major surface 13, a rear major surface 14, a left end 16, a right end 17, a leveling surface 18 for placing on a generally horizontal surface S, and a top surface 19 opposite the leveling surface 18. The front and rear major surfaces 13 and 14 are co-directional with the longitudinal axis 12. The leveling surface 18 extends widthwise between the front and rear major surfaces 13 and 14.

The spirit level 10 includes a central horizontal bubble vial 21 having a longitudinal axis parallel to the leveling surface 18 for providing a visual indication of the inclination of the generally horizontal surface S relative to the horizontal, and a pair of vertical bubble vials 22 and 23 each having a longitudinal axis perpendicular to the leveling surface 18 at opposite ends of the main body 11 for providing a visual indication of the inclination of a generally vertical surface relative to the vertical. The horizontal bubble vial 21 can have a conventional shape including inter alia a cylindrical shape, a rectangular parallelepiped shape, a banana shape, and the like. Alternatively, the horizontal bubble vial 21 can have specifically designed shapes. The horizontal bubble vial 21 can be sighted along a direct line of sight denoted LOS bounded between FIG. 1's direct front elevation view denoted FEV through a direct top plan view denoted TPV to a direct rear elevation view denoted REV opposite to the front elevation view.

The present invention can be equally applied to a conventional cylindrical horizontal bubble vial 30A as shown in FIGS. 2 to 6, and a conventional rectangular parallelepiped horizontal bubble vial 30B as shown in FIGS. 7 to 11. The horizontal bubble vial 30B is rotated at 45° to the conventional mounting of rectangular parallelepiped horizontal bubble vial in which a user observes a flat surface in a top plan view towards the leveling surface 18 for exposition of the present invention as described hereinbelow.

A horizontal bubble vial 30 has a longitudinal axis 31 co-directional with the spirit level's longitudinal axis 12 and an injection molded thin walled transparent vial body 32. The vial body 32 has a left end 32A and a right end 32B. The vial body 32 has an external peripheral surface 33 and an internal barrel shaped cavity 34. The cavity 34 has a central region 36, an internal cavity surface 37; a sealed end 38 and an open end 39. The cavity 34 is nearly entirely filled with a vial liquid 41. The sealed end 38 is hermetically sealed with a plug 42 in a conventional manner, for example, gluing, ultrasonic welding, and the like.

The vial liquid 41 has a concave meniscus 43 leaving an ellipsoidal bubble 44 floating at the top of the cavity's central region 36. The meniscus 43 has a central meniscus surface 46, a pair of opposite lengthwise directed curved meniscus sides 47A and 47B respectively adjacent the rear major surface 14 and the front major surface 13, and a left transverse directed curved meniscus end 48A disposed toward the spirit level left end 16 and a right transverse directed curved meniscus end 48B disposed toward the spirit level right end 17. The bubble 44 is preferably air, a noble gas, and the like. The bubble 44 has an uppermost bubble surface 45 uppermost bounded by the internal cavity surface 37 and peripherally bounded by the meniscus sides 47A and 47B and the meniscus ends 48A and 48B on placing a spirit level on a horizontal surface.

The bubble vial 30 is provided with a pair of spaced apart reference markings 49 at its central region 36 either on its cavity's internal cavity surface 37 or its external peripheral surface 33 for assisting a user to accurately determine the bubble location with respect thereto for determining the inclination to a generally horizontal surface relative to the horizontal. Horizontal bubble vials 30 are typically designed such that their bubbles 44 fit snugly between their spaced apart reference markings 49 on placing same on a horizontal surface.

For the purpose of explaining the present invention, the horizontal bubble vial's external peripheral surface 33 is divided into four quadrants by a pair of orthogonal bubble vial planes as follows: A lengthwise directed vertical bubble vial plane 51 perpendicular to the leveling surface 18 and traversing the bubble cavity's central region 36 and corresponding to a direct top plan view TPV of the horizontal bubble vials 30A and 30B. And, a horizontal bubble vial plane 52 parallel to the leveling surface 18 and traversing the bubble cavity's central region 36 and corresponding to a directed front elevation view FEV of the horizontal bubble vials 30A and 30B. The vertical and horizontal bubble vial planes 51 and 52 intersect at an origin O.

Accordingly, the vertical and horizontal bubble vial planes 51 and 52 divide the external peripheral surface 33 into four bubble vial surfaces as follows: a front upper bubble vial surface 53, a rear upper bubble vial surface 54, a front lower bubble vial surface 56, and a rear lower bubble vial surface 57 correspondingly in a front upper quadrant denoted FUQ, a rear upper quadrant denoted RUQ, a front lower quadrant denoted FLQ, and a rear lower quadrant RLQ in a transverse cross section as viewed from a left end elevation view of the main body 11. The cylindrical horizontal bubble vial 30A has quarter cylindrical bubble vial surfaces section 53, 54, 56 and 57. The rectangular parallelepiped horizontal bubble vial 30B has flat inclined bubble vial surfaces 53, 54, 56 and 57. A top plan view TPV of the horizontal bubble vials 30A and 30B reveals the front and rear upper bubble vial surfaces 53 and 54. A front elevation view FEV of the horizontal bubble vials 30A and 30B reveals the front upper and lower bubble vial surfaces 53 and 56.

A user typically sights the horizontal bubble vial 30 along a line of sight denoted LOS typically midway between the top plan view TPV and the front elevation view FEV. The user's line of sight LOS traverses the front upper bubble vial surface 53 which is transparent for enabling observation of the bubble 44. Accordingly, the user observes the meniscus side 47A adjacent the rear major surface 14 on the bubble vial 30's far side relative to his position, the meniscus side 47B adjacent the front major surface 13 on the bubble vial 30's near side relative to his position, the meniscus end 48A on the bubble vial 30's left side relative to his position and the curved meniscus end 48B on the bubble vial 30's right side relative to his position.

The present invention is directed toward horizontal bubble vials 60A-60H similar to horizontal bubble vials 30 and additionally having a coloring agent 70 at least partially in an upper half of the rear upper quadrant RUQ for coloring the bubble surface 45 as perceived by a user sighting a horizontal bubble vial 60 through its transparent front upper bubble vial surface 53 as will now be described with reference to FIGS. 12 to 38.

Figure 12:
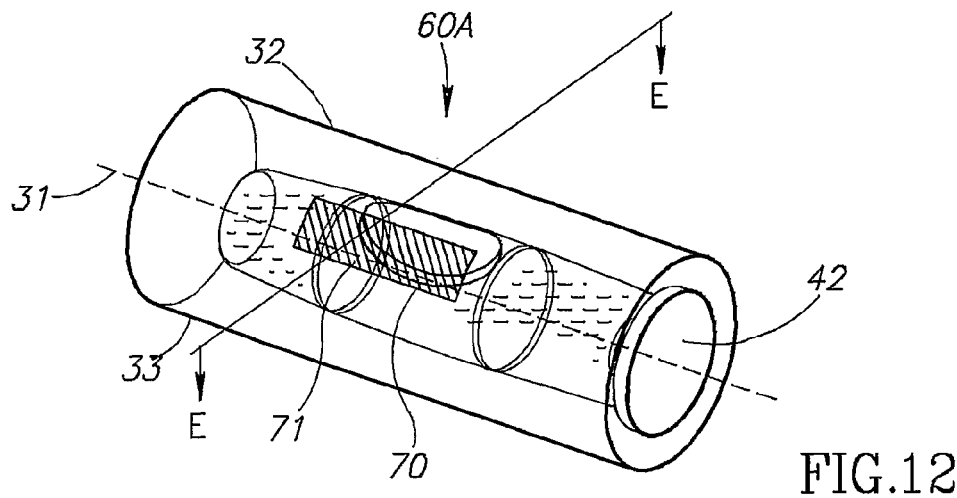
FIG. 12 is a rear perspective view of a first preferred embodiment of a horizontal bubble vial with a coloring agent for improving bubble visibility for indicating the inclination of a generally horizontal surface relative to the horizontal.
Figure 13:
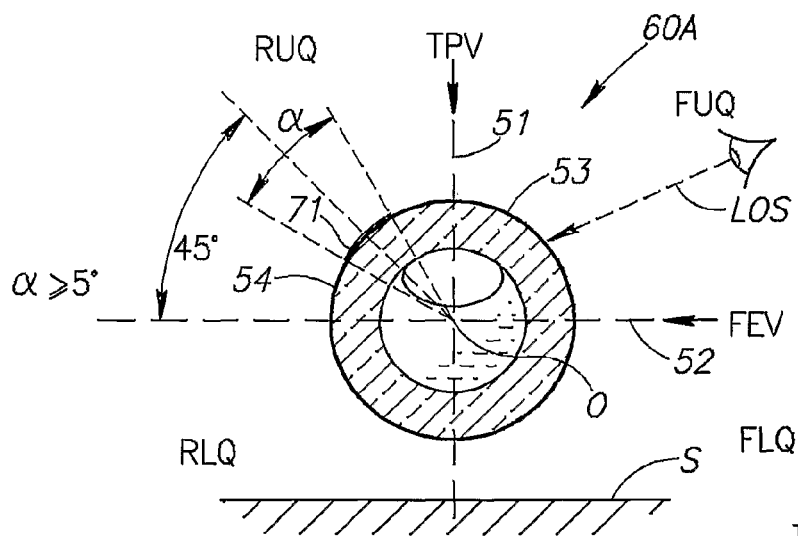
FIG. 13 is a transverse cross section of FIG. 12's bubble vial along line E-E therein as viewed from a left end elevation view.
Figure 14:
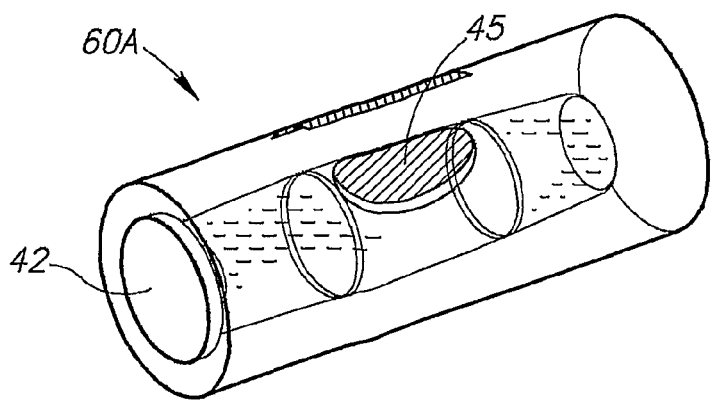
FIG. 14 is a front perspective view of FIG. 12's bubble vial as perceived by a user sighting same along FIG. 13's line of sight.

FIGS. 12 to 14 show a cylindrical horizontal bubble vial 60A similar to the horizontal bubble vial 30A and additionally having a coloring agent 70 constituted by a short thin colored stripe 71 in the rear upper quadrant RUQ on the rear upper bubble vial surface 54 for coloring the bubble surface 45 as perceived by a user observing the bubble 44 through the transparent front upper bubble vial surface 53 along a direct line of sight LOS bounded between the direct top plan view TPV and the direct front elevation view FEV. The colored stripe 71 has a lengthwise directed length extending slightly beyond the pair of spaced apart reference markings 49. The colored stripe 71 covers a 30° arc having an arc center at the origin O. The arc is centered along the 45° bisector of the rear upper quadrant RUQ. The user perceives the bubble surface 45 colored by the colored stripe 71 as denoted by shading in FIG. 14.

Figure 15:
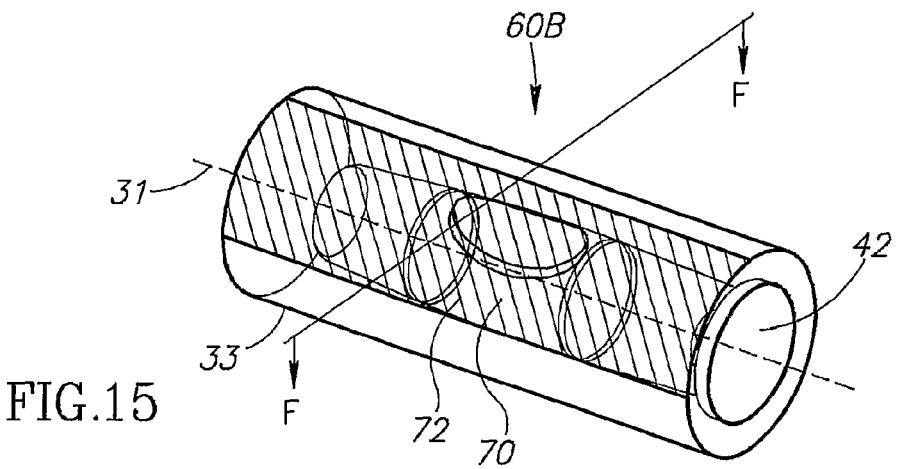
FIG. 15 is a rear perspective view of a second preferred embodiment of a horizontal bubble vial with a coloring agent for improving bubble visibility for indicating the inclination of a generally horizontal surface relative to the horizontal.
Figure 16:
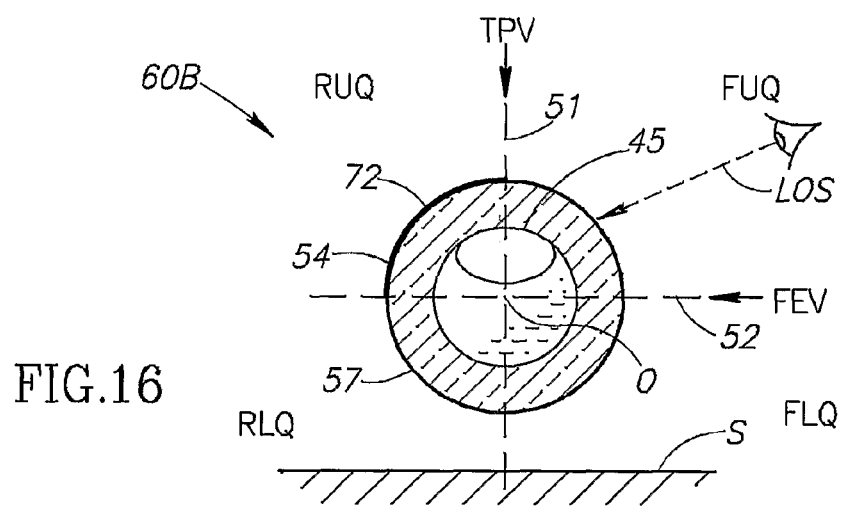
FIG. 16 is a transverse cross section of FIG. 15's bubble vial along line F-F therein from a left end elevation view.
Figure 17:
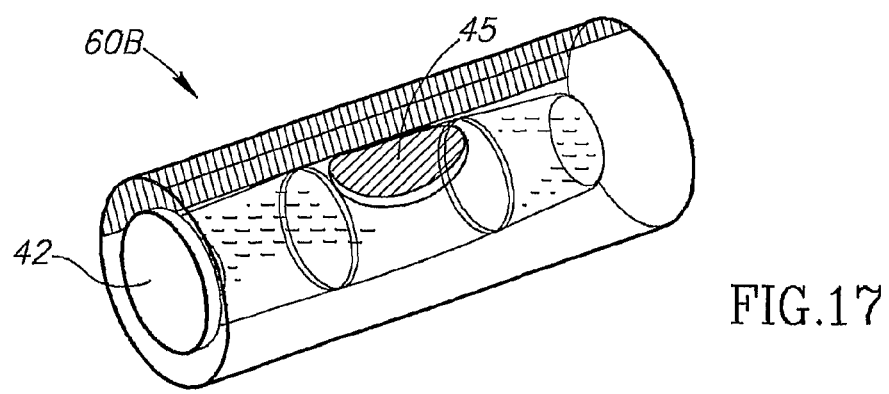
FIG. 17 is a front perspective view of FIG. 15's bubble vial as perceived by a user sighting same along FIG. 16's line of sight.

FIGS. 15 to 17 show a cylindrical horizontal bubble vial 60B similar to the horizontal bubble vial 30A and additionally having a coloring agent 70 constituted by a long quarter cylindrical colored stripe 72 on the rear upper bubble vial surface 54 for coloring the bubble surface 45 as perceived by a user observing the bubble 44 through the transparent front upper bubble vial surface 53 along a direct line of sight LOS bounded between the top plan view TPV and the front elevation view FEV. The colored stripe 72 extends along the bubble vial's entire length. The colored: stripe 72 is disposed over the entire rear upper bubble vial surface 54. The user perceives the bubble surface 45 colored by the colored stripe 72 as denoted by shading in FIG. 17. Bubble visibility can be further accentuated by provisioning the horizontal bubble vial 60B with a bright opaque background on the rear lower bubble vial surface 57.

Figure 18:
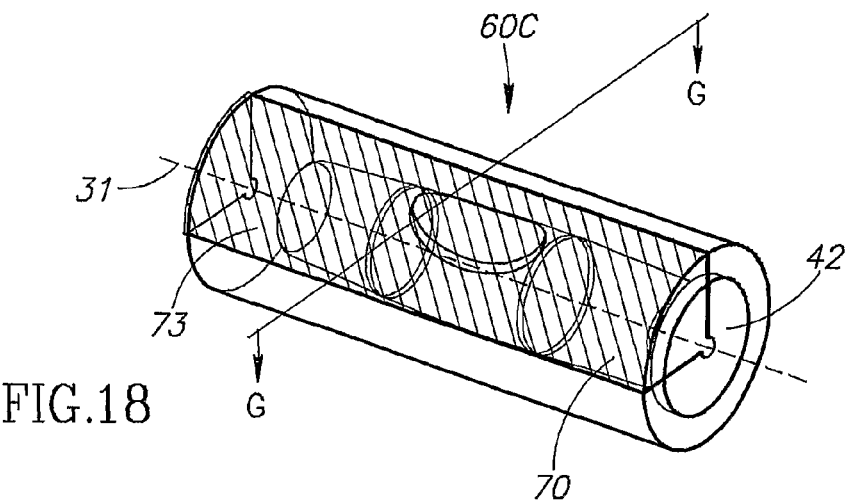
FIG. 18 is a front perspective view of a third preferred embodiment of a horizontal bubble vial with a coloring agent in a first operative position for improving bubble visibility for indicating the inclination of a generally horizontal surface relative to the horizontal.
Figure 19:
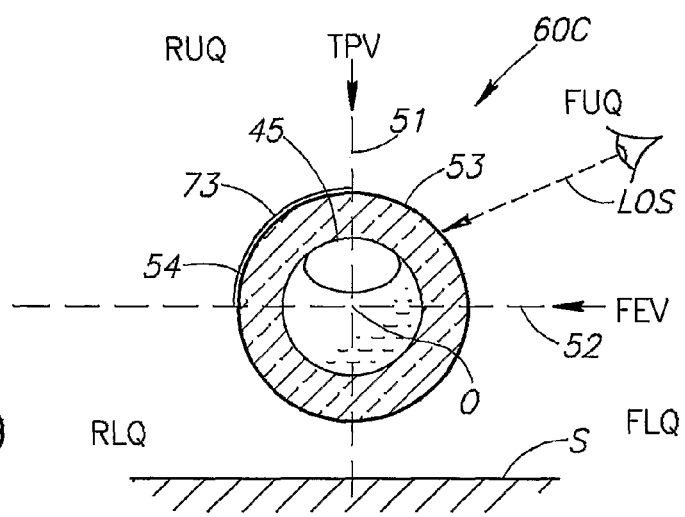
FIG. 19 is a transverse cross section of FIG. 18's bubble vial along line G-G therein from a left end elevation view.
Figure 20:
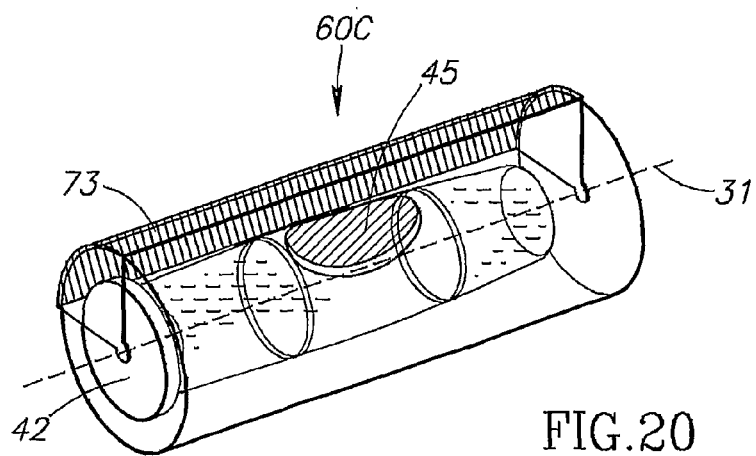
FIG. 20 is a rear perspective view of FIG. 18's bubble vial as perceived by a user sighting same along FIG. 19's line of sight.
Figure 21:
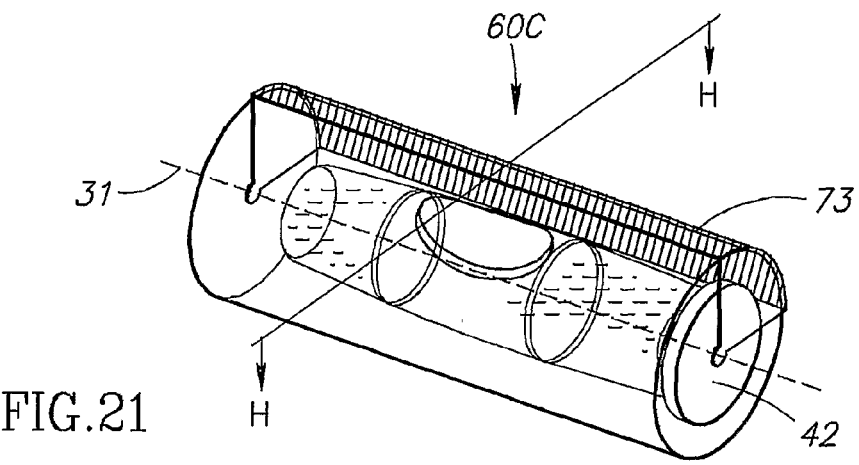
FIG. 21 is a front perspective view of FIG. 18's horizontal bubble vial with its coloring agent in its second operative position for improving bubble visibility for indicating the inclination of a generally horizontal surface relative to the horizontal.
Figure 22:
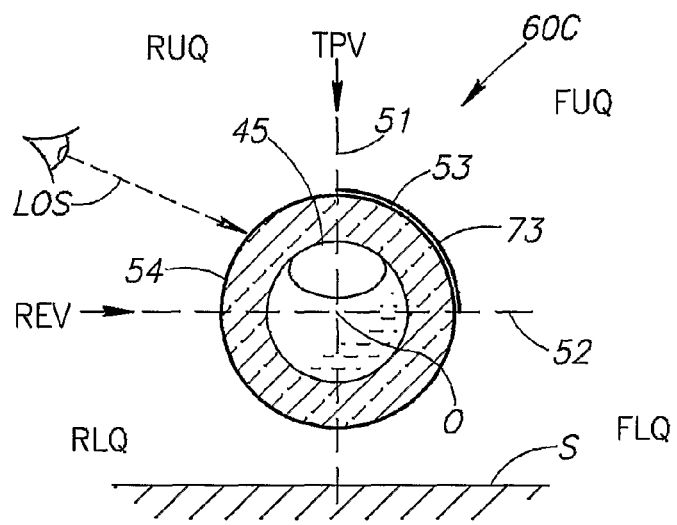
FIG. 22 is a transverse cross section of FIG. 21's bubble vial along line H-H therein from a left end elevation view.
Figure 23:
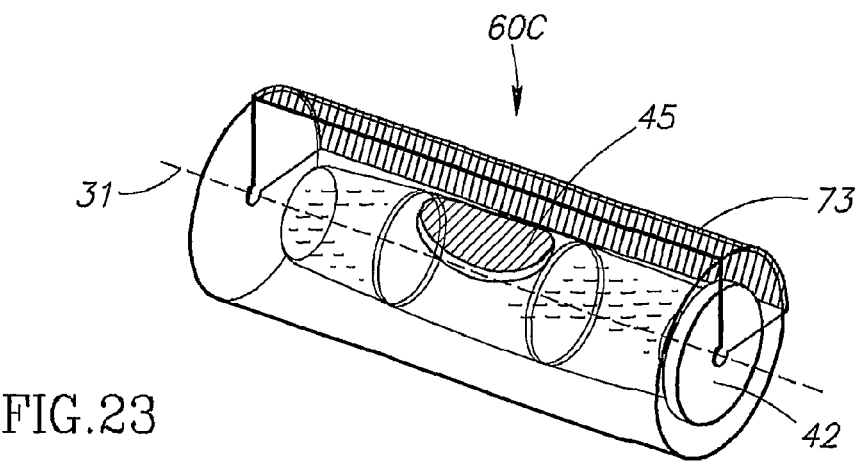
FIG. 23 is a rear perspective view of FIG. 21's bubble vial as perceived by a user sighting same along FIG. 22's line of sight.

FIGS. 18 to 23 show a cylindrical horizontal bubble vial 60C similar to the horizontal bubble vial 30A and additionally having a coloring agent 70 constituted by a lengthwise directed quarter cylindrical colored discrete plastic member 73 pivotal with respect to the bubble vial 60C between a first operative position (see FIGS. 18 to 20) and a second operative position (see FIGS. 21 to 23). FIGS. 18 to 20 show the colored member 73 disposed in the rear upper quadrant RUQ covering the rear upper bubble vial surface 54 such that a user sighting the bubble 44 through the front upper bubble vial surface 53 perceives the bubble surface 45 colored as denoted in FIG. 20. Conversely, FIGS. 21 to 23 show the colored member 73 disposed in the front upper quadrant FUQ covering the front upper bubble vial surface 53 such that a user sighting the bubble 44 through the rear upper bubble vial surface 54 perceives the bubble surface 45 colored as denoted in FIG. 23. Thus, a spirit level 10 with a horizontal bubble vial 60C including the colored member 73 affords a user being able to sight the horizontal bubble vial 60C in both front and rear elevation views as opposed to the single front elevation view in the case of the color stripes 71 and 72.

Figure 24:
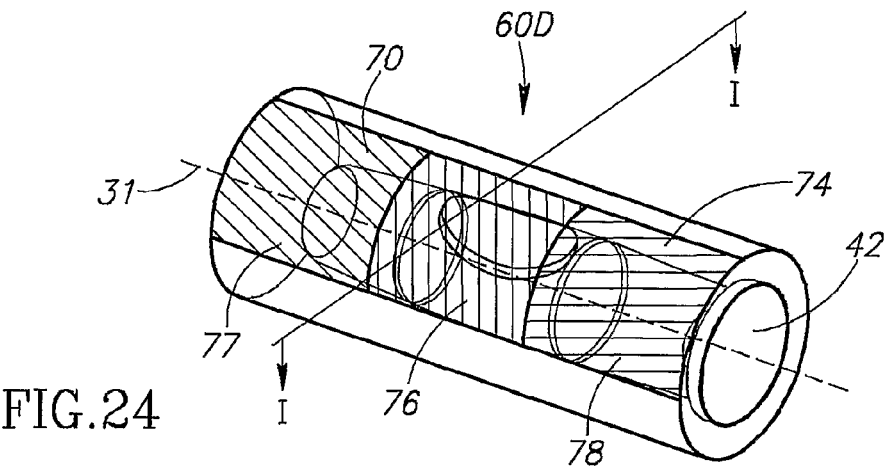
FIG. 24 is a rear perspective view of a fourth preferred embodiment of a horizontal bubble vial with a segmented coloring agent for improving bubble visibility for indicating the inclination of a generally horizontal surface relative to the horizontal.
Figure 25:
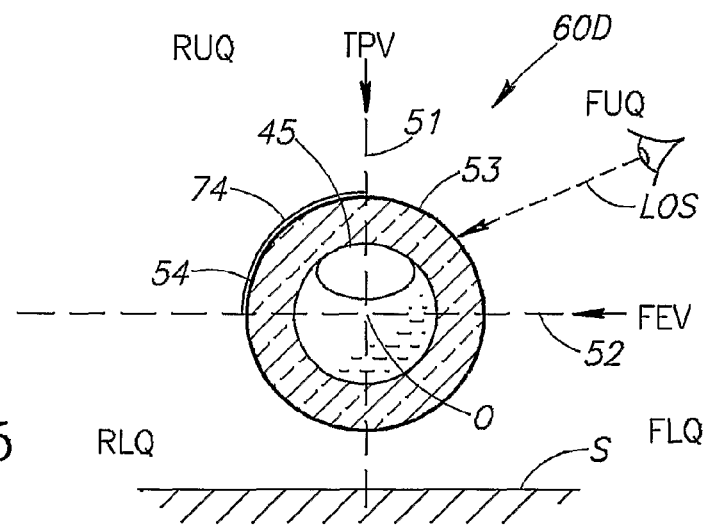
FIG. 25 is a transverse cross section of FIG. 24's bubble vial along line I-I therein from a left end elevation view.
Figure 26:
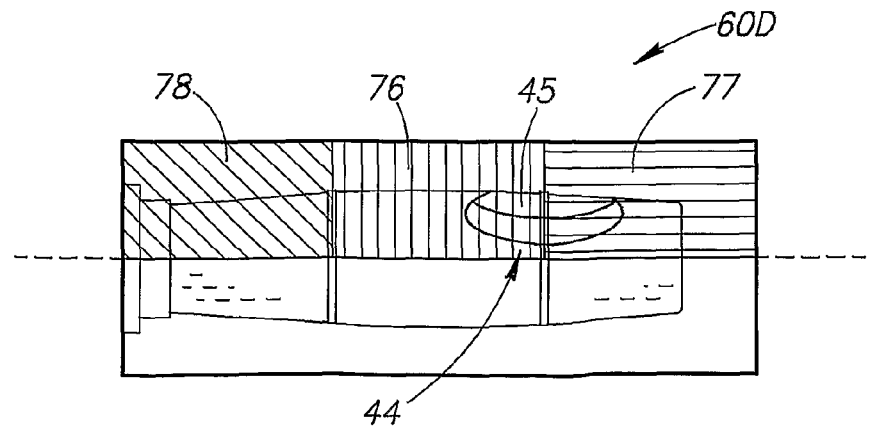
FIG. 26 is a front elevation view of FIG. 24's bubble vial as perceived by a user sighting same along FIG. 25's line of sight.
Figure 27:
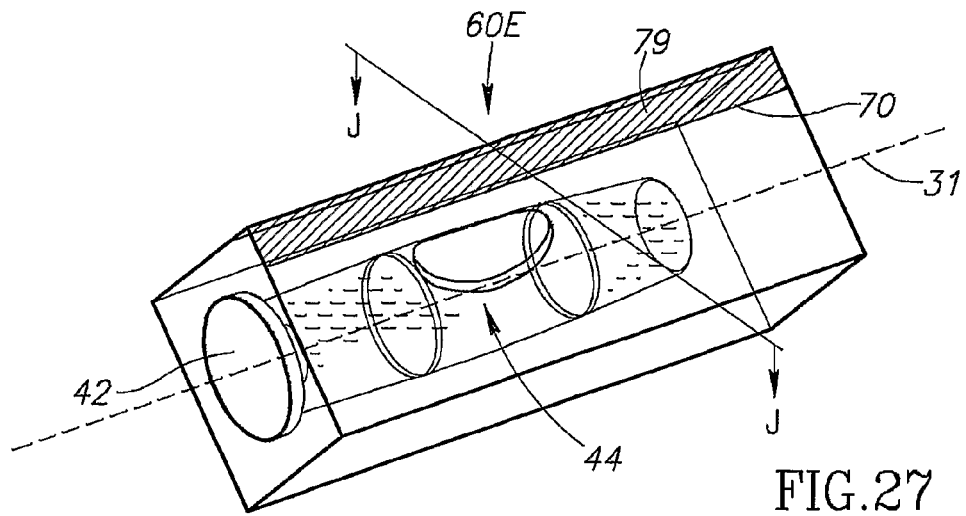
FIG. 27 is a front perspective view of a fifth preferred embodiment of a horizontal bubble vial with a coloring agent for improving bubble visibility for indicating the inclination of a generally horizontal surface relative to the horizontal.
Figure 28:
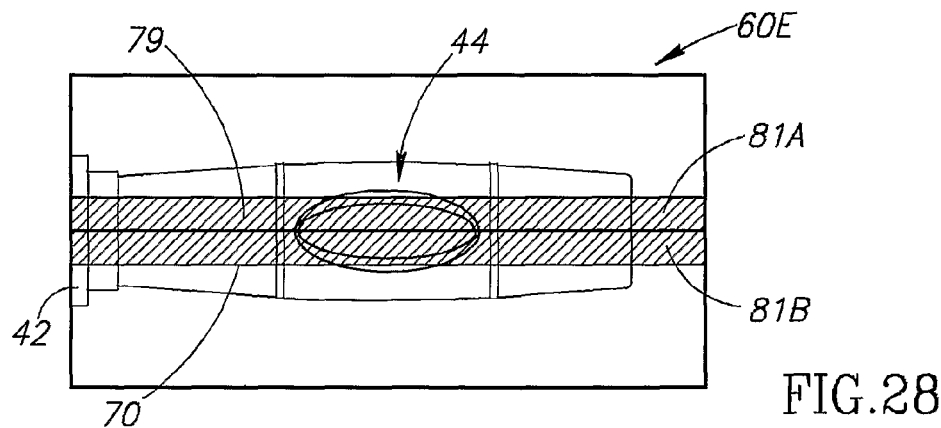
FIG. 28 is a top plan view of FIG. 27's bubble vial.
Figure 29:
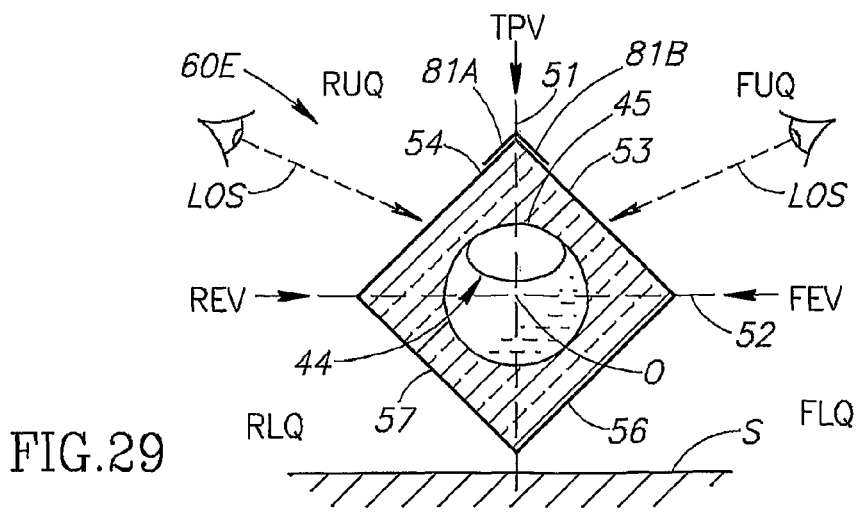
FIG. 29 is a transverse cross section of FIG. 27's bubble vial along line J-J therein from a left end elevation view.
Figure 30:
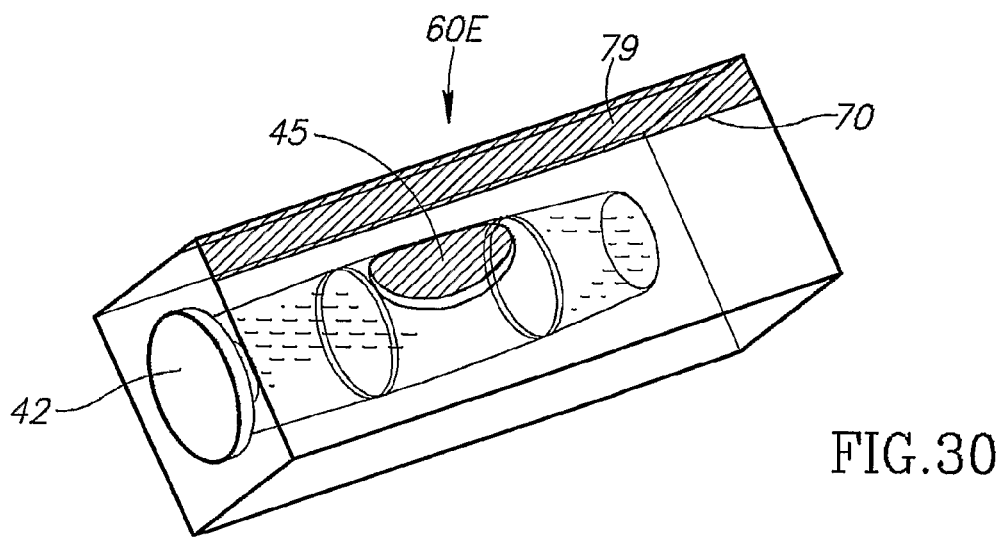
FIG. 30 is a front perspective view of FIG. 27's bubble vial as perceived by a user sighting same along FIG. 29's front elevation view.
Figure 31:
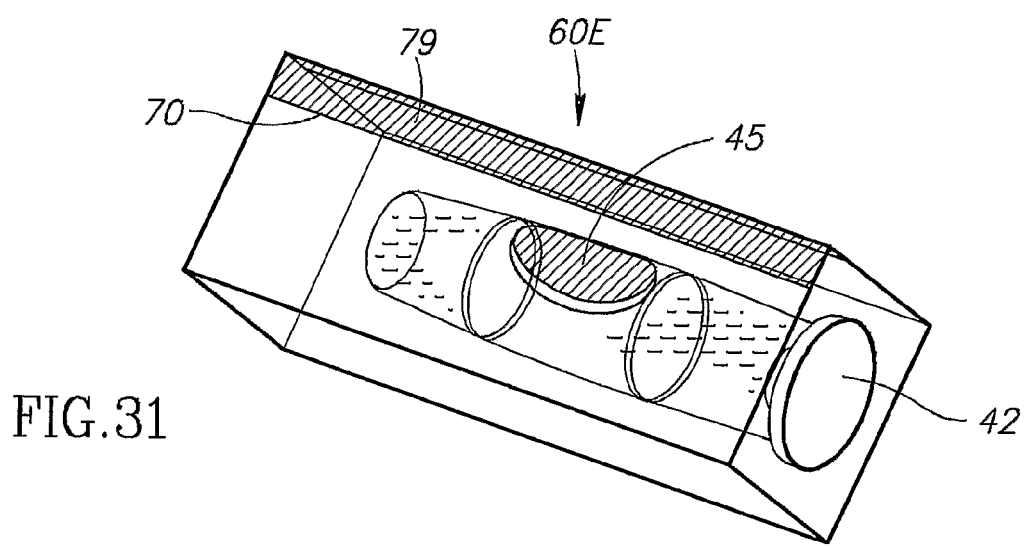
FIG. 31 is a front perspective view of FIG. 27's bubble vial as perceived by a user sighting same along FIG. 29's rear elevation view.
Figure 32:
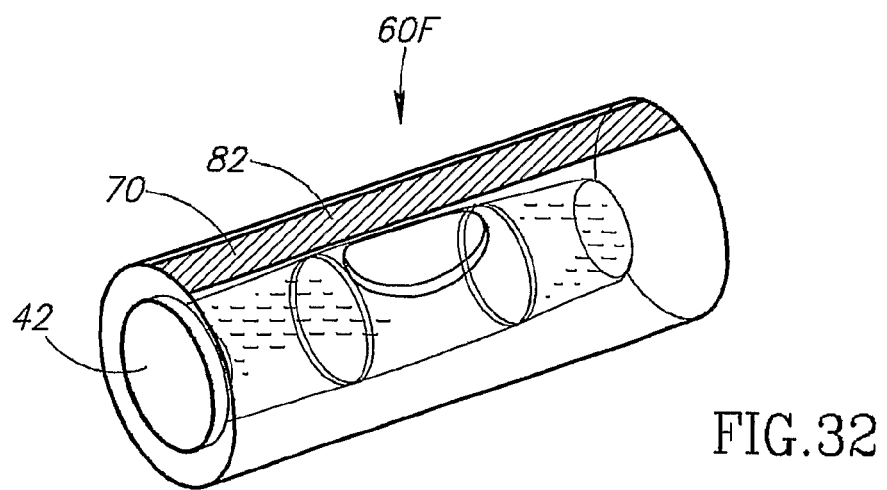
FIG. 32 is a front perspective view of a sixth preferred embodiment of a horizontal bubble vial with a coloring agent for improving bubble visibility for indicating the inclination of a generally horizontal surface relative to the horizontal.

FIGS. 24 to 26 show a cylindrical horizontal bubble vial 60D similar to the horizontal bubble vial 30A and additionally having a coloring agent 70 constituted by a long quarter cylindrical segmented colored stripe 74 similar to the colored stripe 72. The segmented colored stripe 74 preferably includes a central segment 76 co-extensive with the pair of reference markings 49 and two end segments 77 and 78 lateral to the central segment 76. The central segment 76 is colorless or colored. The end segments 77 and 78 are color contrasted with the central segment 76. The end segments 77 and 78 can be the same color or different colors. The colored stripe 74 colors the bubble surface 45 in a similar manner as the colored stripe 72 except that in this case a user can readily determine the required correction to center its bubble 44 depending on the relative lengths of the perceived colors along the bubble surface 45 as afforded by one or more of the segments 76, 77 and 78 depending on the position of the bubble 44.

FIGS. 27 to 31 show a horizontal bubble vial 60E similar to the horizontal bubble vial 30B and additionally having a coloring agent 70 constituted by an inverted V-shaped long color stripe 79 having a first elongated stripe member 81A for covering the uppermost stretch of the rear upper bubble vial surface 54 and a second elongated stripe member 81B for covering the covering the uppermost stretch of the rear upper bubble vial surface 53. The user perceives the bubble surface 45 colored by the stripe member 81A on sighting the bubble 44 from the front upper quadrant FUQ (see FIG. 30) and the stripe member 81B on sighting the bubble from the rear upper quadrant RUQ (see FIG. 31). Bubble visibility can be further accentuated by provisioning the horizontal bubble vial 60E with bright opaque backgrounds on the front lower bubble vial surface 56 and the rear lower bubble vial surface 57. Thus, a spirit level 10 with a horizontal bubble vial 60E including the inverted V-shaped long color stripe 79 affords a user being able to sight the horizontal bubble vial 60E in both direct front and rear elevation views as opposed to the single front elevation view in the case of the color stripes 71 and 72. Similarly, a horizontal bubble vial 60F can be provisioned with a coloring agent 70 constituted by an inverted U-shaped long color stripe 82 (see FIG. 32).

Figure 33:
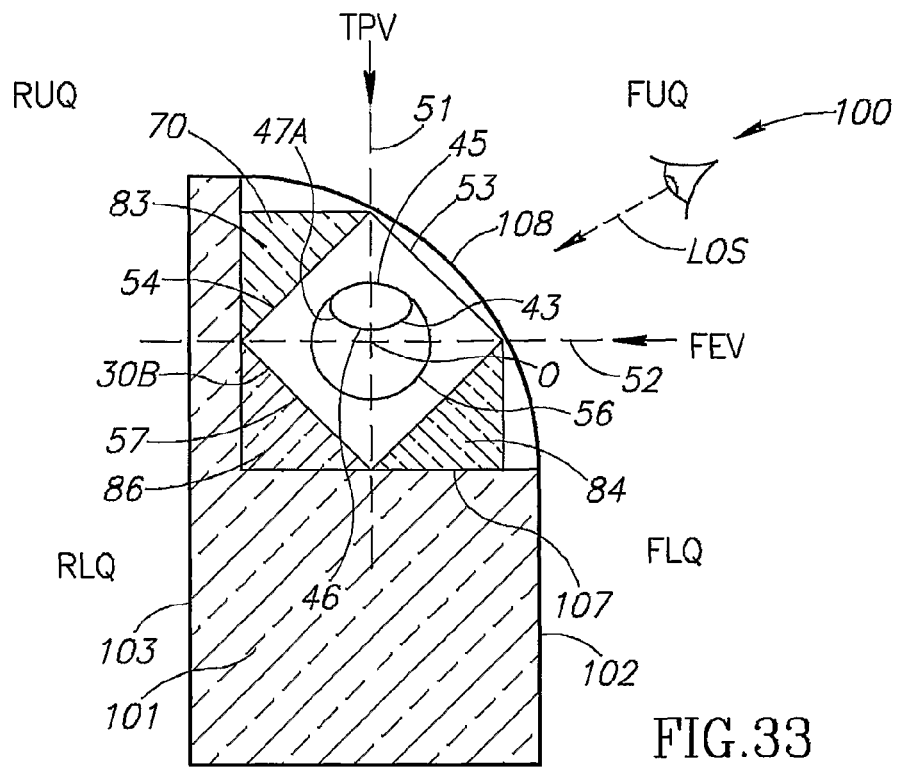
FIG. 33 is a transverse cross section from a left end elevation view of a one sided spirit level including a horizontal bubble vial with a coloring agent and two additional elements for improving bubble visibility.
Figure 34:
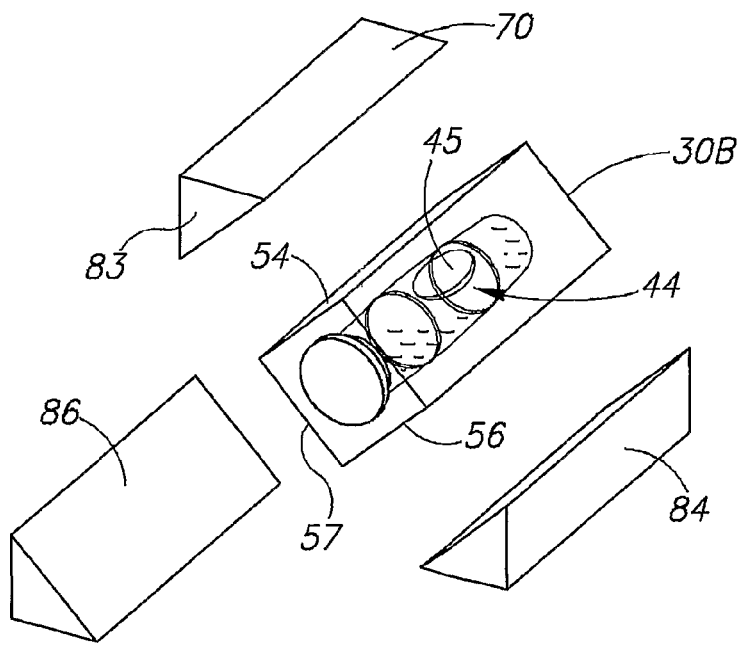
FIG. 34 is an exploded view of FIG. 33's horizontal bubble vial and coloring agent.

FIGS. 33 and 34 show a one sided spirit level 100 including a main body 101 having a front major surface 102, a rear major surface 103, a leveling surface 104 for placing on a generally horizontal surface S, and a top surface 106 opposite the leveling surface 104. The main body 101 is formed with a vial pocket 107 for receiving a conventional horizontal bubble vial 30B and a coloring agent 70. The bottom half of the horizontal bubble vial 30B including the front and rear lower bubble vial surfaces 56 and 57 are concealed from view by the front major surface 102 in a front elevation view FEV. The spirit level 100 includes a transparent window 108 for sealing the vial pocket 107. The coloring agent 70 is constituted by a lengthwise directed transparent or opaque colored uniform triangular prism 83 disposed against the rear upper bubble vial surface 54 for coloring the bubble surface 45 as perceived by a user sighting the bubble 44 along a direct line of sight LOS bounded between the direct top plan view TPV and the direct front elevation view FEV in the front upper quadrant FUQ.

The spirit level 100 also includes an additional lengthwise directed transparent or opaque colored uniform triangular prism 84 disposed against the front lower bubble vial surface 56 for coloring the central meniscus surface 46 as perceived by a user sighting the bubble 44 along the direct line of sight LOS. The spirit level 100 also includes a typically white opaque uniform triangular prism 86 disposed against the rear lower bubble vial surface 57 for providing a bright background for further accentuating the bubble surface 45 and the central meniscus surface 46 as perceived by a user.

Figure 35:
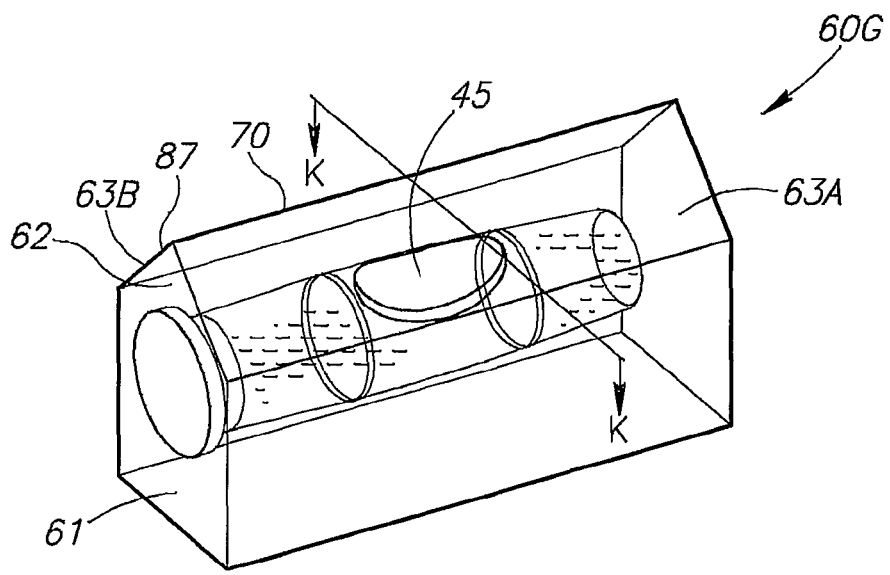
FIG. 35 is a front perspective view of a seventh preferred embodiment of a horizontal bubble vial with a coloring agent for improving bubble visibility for indicating the inclination of a generally horizontal surface relative to the horizontal.
Figure 36:
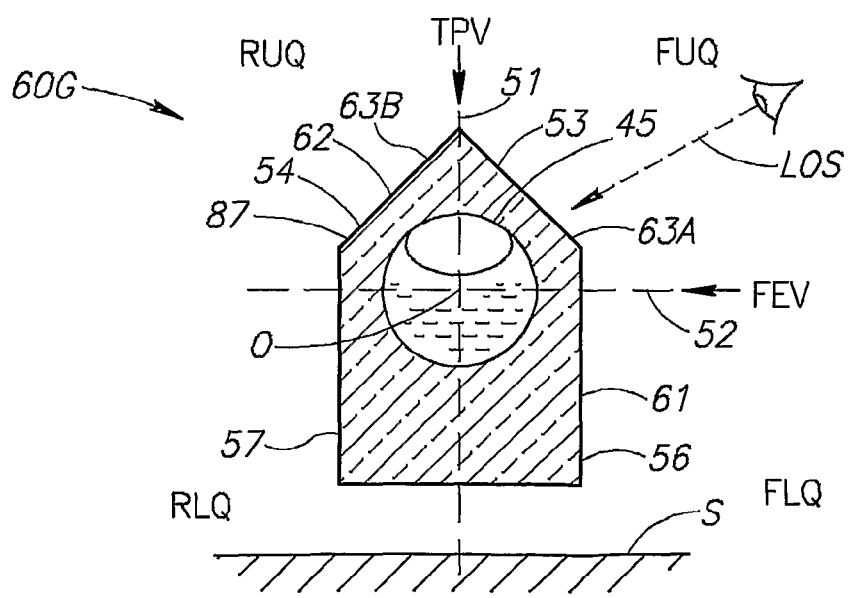
FIG. 36 is a transverse cross section of FIG. 35's bubble vial along line K-K therein from a left end elevation view.

FIGS. 35 and 36 show a specifically designed horizontal bubble vial 60G with improved bubble visibility for indicating the inclination of a generally horizontal surface relative to the horizontal. The horizontal bubble vial 60G includes a rectangular parallelepiped base portion 61 and a uniform triangular prism 62 having a pair of oppositely inclined flat surfaces 63A and 63B. The vertical and horizontal bubble vial planes 51 and 52 divide the horizontal bubble vial 60G's external peripheral surface 33 into a front upper bubble vial surface 53 constituted by the inclined flat surface 63A, a rear upper bubble vial surface 54 constituted by the inclined flat surface 63B, an upright front lower bubble vial surface 56, and an upright rear lower bubble vial surface 57 correspondingly in the front upper quadrant denoted FUQ, the rear upper quadrant denoted RUQ, the front lower quadrant denoted FLQ, and the rear lower quadrant RLQ. The horizontal bubble vial 60G includes a coloring agent 70 constituted by a long wide planar color stripe 87 disposed on the rear upper bubble vial surface 54. A user perceives the bubble surface 45 being colored by the color stripe 87 on sighting the bubble 44 along a direct line of sight LOS bounded between the direct top plan view TPV and the direct front elevation view FEV in a similar manner as the color stripe 72. Alternatively, the horizontal bubble vial 60O can be provisioned with the inverted V-shaped long color stripe 79.

Figure 37:
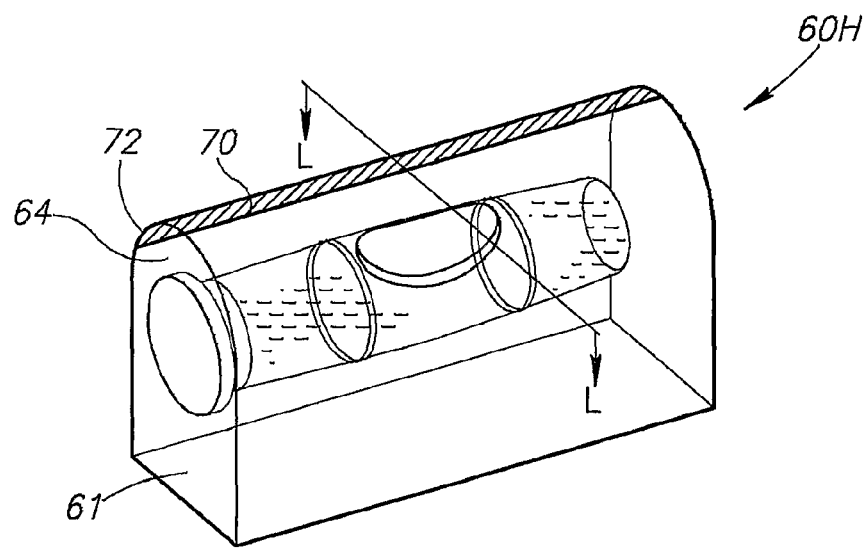
FIG. 37 is a front perspective view of an eighth preferred embodiment of a horizontal bubble vial with a coloring agent for improving bubble visibility for indicating the inclination of a generally horizontal surface relative to the horizontal.
Figure 38:
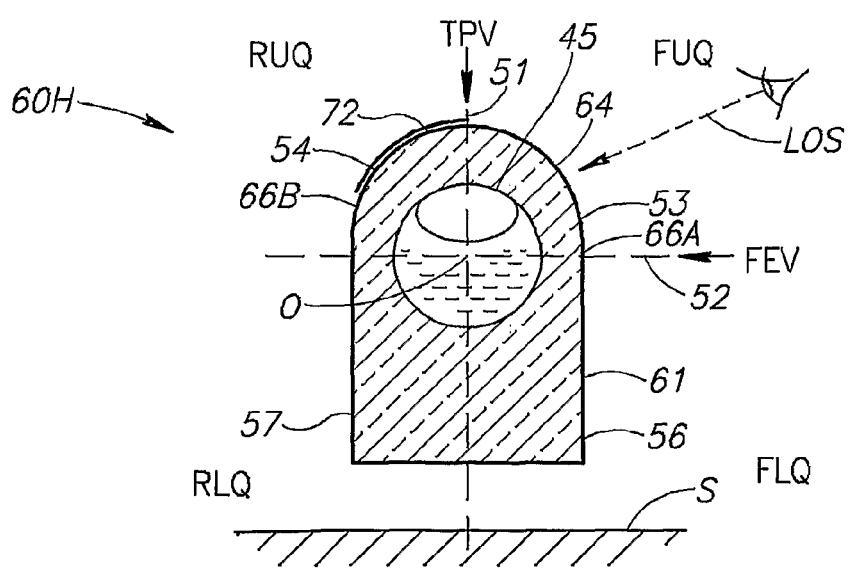
FIG. 38 is a transverse cross section of FIG. 37's bubble vial along line L-L therein from a left end elevation view.

FIGS. 37 and 38 show a specifically designed horizontal bubble vial 60H similar to the horizontal bubble vial 60O except that the former includes a semi-cylindrical top portion 64 having a pair of quarter cylindrical surfaces 66A and 66B. The vertical and horizontal bubble vial planes 51 and 52 divide the horizontal bubble vial 60H's external peripheral surface 33 into a front upper bubble vial surface 53 constituted by the quarter cylindrical surface 66A, a rear upper bubble vial surface 54 constituted by the quarter cylindrical surface 66B, an upright front lower bubble vial surface 56, and an upright rear lower bubble vial surface 57 correspondingly in the front upper quadrant denoted FUQ, the rear upper quadrant denoted RUQ, the front lower quadrant denoted FLQ, and the rear lower quadrant RLQ. The horizontal bubble vial 60H includes a coloring agent 70 constituted by the quarter cylindrical color stripe 72 disposed on the rear upper bubble vial surface 54. A user perceives the bubble surface 45 being colored by the color stripe 72 on sighting the bubble 44 along a direct line of sight LOS bounded between the direct top plan view TPV and the direct front elevation view FEV. Alternatively, the horizontal bubble vial 60H can be provisioned with the inverted U-shaped long color stripe 82.

While the invention has been described with respect to a limited number of embodiments, it will be appreciated that many variations, modifications, and other applications of the invention can be made within the scope of the appended claims.

The invention claimed is:
1. A spirit level for placing on a generally horizontal surface for providing a visually intensified indication of the inclination of the generally horizontal surface relative to the horizontal, the level comprising:
 (a) a main body having a longitudinal axis, a front major surface, a rear major surface, a left end, a right end, and a leveling surface for placing on the generally horizontal surface, said front major surface and said rear major surface being co-directional with said longitudinal axis, and said leveling surface extending widthwise between said front major surface and said rear major surface;

(b) a horizontal bubble vial mounted lengthwise in said main body and having a longitudinal axis parallel to said leveling surface, said bubble vial having an external peripheral surface and a lengthwise directed elongated bubble cavity having an internal cavity surface, said bubble cavity having a central region with at least one reference marking, said bubble cavity being filled with a vial liquid having a concave meniscus with a central meniscus surface, a pair of opposite lengthwise directed curved meniscus sides and a pair of opposite transverse directed curved meniscus ends, said bubble cavity having a lengthwise directed ellipsoidal bubble floating on said vial liquid at said central region on placement of the spirit level on a horizontal surface, said bubble having an uppermost bubble surface uppermost bounded by said internal cavity surface and peripherally bounded by said curved meniscus sides and said curved meniscus ends on placement of the spirit level on a horizontal surface, said bubble vial having a pair of orthogonal bubble vial planes including:

i) a lengthwise directed vertical bubble vial plane perpendicular to said leveling surface and traversing said bubble cavity at said central portion and corresponding to a direct top plan view of said bubble vial, and ii) a horizontal bubble vial plane parallel to said leveling surface and traversing said bubble cavity at said central portion and corresponding to a direct front elevation view of said bubble vial, said pair of orthogonal bubble vial planes dividing said external peripheral surface into a front upper bubble vial surface, a rear upper bubble vial surface, a front lower bubble vial surface, and a rear lower bubble vial surface correspondingly in a front upper quadrant, a rear upper quadrant, a front lower quadrant, and a rear lower quadrant in a transverse cross section of said main body from a left end elevation view, said front upper bubble vial surface being transparent for enabling user observation of said bubble vial along a line of sight bounded between said top plan view and said front elevation view in said front upper quadrant in said left end elevation view; and (c) a coloring agent at least partially disposed in an upper half of said rear upper quadrant in said transverse cross section in close proximity with said central region such that, on placing the spirit level on the generally horizontal surface, a user sighting said bubble vial along a direct line of sight bounded between said top plan view and said front elevation view perceives said bubble surface as being colored by said coloring agent thereby improving bubble visibility for assisting user readability for leveling purposes.

2. The level according to claim 1 wherein said bubble vial includes a pair of spaced apart reference markings at said central region and said coloring agent extends lengthwise at least between said pair of spaced apart reference markings.

3. The level according to claim 1 wherein said coloring agent subtends a minimum arc of at least 5° in said transverse cross section and said arc has an arc center at an intersection of said vertical and horizontal bubble vial planes.

4. The level according to claim 1 wherein said vial liquid is colored and said coloring agent is color contrasted with said colored vial liquid.

5. The level according to claim 1 wherein said coloring agent is segmented lengthwise between a central segment substantially co-extensive with said central region and a pair of end segments lateral and color contrasted relative to said central segment.

6. The level according to claim 1 and further comprising a second coloring agent at least partially disposed in an upper half of said front upper quadrant in said transverse cross section in close proximity with said central region such that, on placing the spirit level on the generally horizontal surface, a user sighting said bubble vial along a line of sight bounded between said top plan view and a rear elevation view opposite to said front elevation view perceives said bubble surface as being colored by said second coloring agent thereby improving bubble visibility for assisting user readability for leveling purposes.

7. The level according to claim 1 wherein said coloring agent is constituted by a colored member pivotal with respect to said main body for enabling a user to select his line of sight directed toward either said front major surface or said rear major surface.

8. The level according to claim 1 wherein said bubble vial has a transparent rear lower bubble vial surface in said rear lower quadrant in said transverse cross section.

9. The level according to claim 1 wherein said bubble vial has a lengthwise directed bright opaque background surface in said rear lower quadrant in said transverse cross section such that, on placing the spirit level on the generally horizontal surface, a user sighting said bubble vial along a line of sight bounded between said top plan view and said front elevation view perceives said colored bubble surface against said bright opaque background thereby further improving bubble visibility for assisting user readability for leveling purposes.

10. The level according to claim 1 wherein said bubble vial has an additional coloring agent disposed in said front lower quadrant in said transverse cross section such that, on placing the spirit level on the generally horizontal surface, a user sighting said bubble vial along a line of sight bounded between said top plan view and said front elevation view perceives said central meniscus surface as being colored in addition to said colored bubble surface thereby further improving bubble visibility for assisting user readability for leveling purposes.

11. A bubble vial comprising:

a vial body having a longitudinal axis, an external peripheral surface and a lengthwise directed elongated bubble cavity having an internal cavity surface, said bubble cavity having a central region with a pair of spaced apart reference markings, said bubble cavity being nearly completely filled with a vial liquid having a concave meniscus with a central meniscus surface, a pair of opposite lengthwise directed curved meniscus sides and a pair of opposite transverse directed curved meniscus ends to leave a lengthwise directed ellipsoidal bubble floating on said vial liquid at said central region on placement of the bubble vial on a horizontal surface, said bubble having an uppermost bubble surface uppermost bounded by said internal cavity surface and peripherally bounded by said curved meniscus sides and said curved meniscus ends on placement of the bubble vial on a horizontal surface, a pair of orthogonal planes in a left end elevation view of the bubble vial including a lengthwise directed vertical plane traversing said bubble cavity at said central region and a horizontal plane traversing said bubble cavity at said central region for dividing said external peripheral surface in a transverse cross section of the bubble vial into a front upper bubble vial surface in a front upper quadrant, a rear upper bubble vial surface in a rear upper quadrant, a front lower bubble vial surface in a front lower quadrant, and a rear lower bubble vial surface in a rear lower quadrant, said front upper bubble vial surface being transparent for enabling user observation of said bubble vial along a line of sight bounded within said front upper quadrant in said left end elevation view; and a coloring agent at least partially disposed in an upper half of said rear upper quadrant and at least lengthwise co-extensive with said pair of reference markings such that a user holding the bubble vial horizontal and observing the bubble vial along a direct line of sight bounded within said front upper quadrant perceives said uppermost bubble surface as being colored by said coloring agent thereby improving bubble visibility for assisting user readability for leveling purposes.

12. The vial according to claim 11 wherein said coloring agent subtends a minimum arc of at least 5° in said transverse cross section and said arc has an arc center at an intersection of said vertical and horizontal planes.

13. The vial according to claim 11 wherein said vial liquid is colored and said coloring agent is color contrasted with said colored vial liquid.

14. The vial according to claim 11 wherein said coloring agent is segmented lengthwise between a central segment substantially co-extensive with said pair of reference markings and a pair of end segments lateral and color contrasted relative to said central segment.

15. The vial according to claim 11 and further comprising a second coloring agent at least partially disposed in an upper half of said front upper quadrant in said transverse cross section in close proximity with said central region such that a user holding the bubble vial horizontal and observing the bubble vial along a line of sight bounded within said rear upper quadrant perceives said bubble surface as being colored by said second coloring agent thereby improving bubble visibility for assisting user readability for leveling purposes.

16. The vial according to claim 11 wherein said coloring agent is constituted by a colored member pivotal with respect to said vial body for enabling a user to select his line of sight bounded within either said front upper quadrant or said rear upper quadrant.

17. The vial according to claim 11 wherein said bubble vial has a transparent rear lower bubble vial surface in said rear lower quadrant in said transverse cross section.

18. The vial according to claim 11 wherein said bubble vial has a lengthwise directed bright opaque background surface in said rear lower quadrant in said transverse cross section such that a user holding the bubble vial horizontal and observing the bubble vial along a line of sight bounded within said front upper quadrant perceives said colored bubble surface against said bright opaque background thereby further improving bubble visibility for assisting user readability for leveling purposes.

19. The vial according to claim 11 and further comprising an additional coloring agent disposed in said front lower quadrant in said transverse cross section such that a user holding the bubble vial horizontal and observing the bubble vial along a line of sight bounded within said front upper quadrant perceives said central meniscus surface as being colored in addition to said colored bubble surface thereby further improving bubble visibility for assisting user readability for leveling purposes.

20. A measuring tool comprising a main body and at least one bubble vial according to claim 11.

* * * * *